United States Patent
Isshiki et al.

(10) Patent No.: US 12,411,079 B2
(45) Date of Patent: Sep. 9, 2025

(54) GAS DETECTION APPARATUS

(71) Applicant: Asahi Kasei Microdevices Corporation, Tokyo (JP)

(72) Inventors: Shota Isshiki, Tokyo (JP); Keiichiro Kuwata, Tokyo (JP); Yuji Ikeda, Kyoto (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 236 days.

(21) Appl. No.: 18/358,022

(22) Filed: Jul. 25, 2023

(65) Prior Publication Data

US 2024/0035958 A1 Feb. 1, 2024

(30) Foreign Application Priority Data

Jul. 26, 2022 (JP) .................. 2022-119041
Jun. 22, 2023 (JP) .................. 2023-102731

(51) Int. Cl.
*G01N 21/25* (2006.01)
*G01N 21/3504* (2014.01)

(52) U.S. Cl.
CPC ....... *G01N 21/255* (2013.01); *G01N 21/3504* (2013.01); *G01N 2201/0637* (2013.01)

(58) Field of Classification Search
CPC .............. G01N 21/255; G01N 21/3504; G01N 2201/0637
See application file for complete search history.

(56) References Cited

U.S. PATENT DOCUMENTS

| 2002/0105650 A1 | 8/2002 | Stuttard |
| 2010/0079760 A1 | 4/2010 | Bernacki |
| 2021/0302309 A1* | 9/2021 | Ikeda ................. G01N 21/3504 |

FOREIGN PATENT DOCUMENTS

| JP | S5538281 U | 3/1980 |
| JP | S57116851 U | 7/1982 |
| JP | 2004522152 A | 7/2004 |
| JP | 2016054230 A | 4/2016 |
| JP | 6626281 B2 | 12/2019 |

* cited by examiner

*Primary Examiner* — Jamil Ahmed
(74) *Attorney, Agent, or Firm* — KENJA IP LAW PC

(57) ABSTRACT

A small-sized gas detection apparatus with high measurement accuracy is provided. The gas detection apparatus includes a light emitting portion (1); a light receiving portion (2); a first mirror (3) that has a quadric reflective surface and reflects light emitted from the light emitting portion; and a second mirror (4) that has a quadric reflective surface and reflects the light reflected by the first mirror to the first mirror. The quadric surfaces of the first mirror and the second mirror have convex portions facing in a same direction. The first mirror reflects the light reflected by the second mirror to the light receiving portion. When one surface of a substrate on which the light emitting portion and the light receiving portion are mounted is used as a reference plane, the first mirror and the second mirror are provided at positions higher than the reference plane and have different heights.

12 Claims, 12 Drawing Sheets

GAS DETECTION APPARATUS

CROSS-REFERENCE TO RELATED APPLICATION

The present application claims priority to and the benefit of Japanese Patent Application No. 2022-119041 filed Jul. 26, 2022 and Japanese Patent Application No. 2023-102731 filed Jun. 22, 2023, the entire contents of which are incorporated herein by reference.

TECHNICAL FIELD

The present disclosure relates to a gas detection apparatus.

BACKGROUND

Gas detection apparatuses for detecting gases have been used in various fields. For example, PTL 1 discloses a gas sensor that has reduced the number of components to achieve downsizing, which introduces a gas into a space between a first substrate and a second substrate and a light reflection portion and detects the light affected by the gas to be detected with a sensor unit to detect the presence of the gas to be detected.

CITATION LIST

Patent Literature

PTL 1: JP 6626281 B
PTL 2: JP 2016-054230 A

SUMMARY

Here, FIG. 6 and FIG. 7 are diagrams for explaining a problem that an image formed in a gas detection apparatus (gas sensor) having an ellipsoid mirror 103 blurs (aberration increases). The gas detection apparatus in FIG. 6 has one of conventional configurations, which includes a light guide member 106 having an inner surface that is a mirror 103 obtained by coupling two ellipsoids. A light source (light emitting portion 101), a light receiving portion 102, and a plane mirror 104 are sealed by a sealing member 105, and the light guide member 106 is also bonded to the sealing member 105. The light emitted from the light emitting portion 101 is reflected by the ellipsoid mirror 103, reflected by the plane mirror 104, and then reflected by the ellipsoid mirror 103 again to reach the light receiving portion 102. In the gas detection apparatus having such a configuration, when the area of the light emitting portion is large, the aberration on the light receiving portion 102 increases. As illustrated in FIG. 7, when the aberration is large (the image blurs), the size of a spot 109 may exceed the size of the light receiving surface of the light receiving portion 102 (right diagram in FIG. 7), and there is thus a problem that the accuracy deteriorates. Therefore, a new configuration of the gas detection apparatuses has been required so that the spot 109 falls within the light receiving surface (left diagram in FIG. 7) to allow detection with high accuracy.

For example, PTL 2 discloses device manufacturing equipment using an Offner optical system, which has a configuration to reduce the aberration. However, the configuration of the large device manufacturing equipment cannot be directly adapted to a downsized gas detection apparatus.

It could be helpful to provide a small-sized gas detection apparatus with high measurement accuracy.

A gas detection apparatus according to an embodiment of the present disclosure comprises:
 a light emitting portion;
 a light receiving portion;
 a first mirror that has a reflective surface being a quadric surface and reflects light emitted from the light emitting portion; and
 a second mirror that has a reflective surface being a quadric surface and reflects the light reflected by the first mirror to the first mirror, wherein
 the quadric surface of the first mirror and the quadric surface of the second mirror have convex portions facing in a same direction,
 the first mirror reflects the light reflected by the second mirror to the light receiving portion, and
 when one surface of a substrate on which the light emitting portion and the light receiving portion are mounted is used as a reference plane, the first mirror and the second mirror are provided at positions higher than the reference plane and have different heights.

According to the present disclosure, a small-sized gas detection apparatus with high measurement accuracy can be provided.

BRIEF DESCRIPTION OF THE DRAWINGS

In the accompanying drawings.

DETAILED DESCRIPTION

The following describes gas detection apparatuses according to embodiments of the present disclosure with reference to the drawings. In each drawing, identical or equivalent parts are denoted by the same reference sign. In the description of the present embodiments, the explanation of identical or equivalent parts is omitted or simplified, as necessary.

First Embodiment

Figure 1:
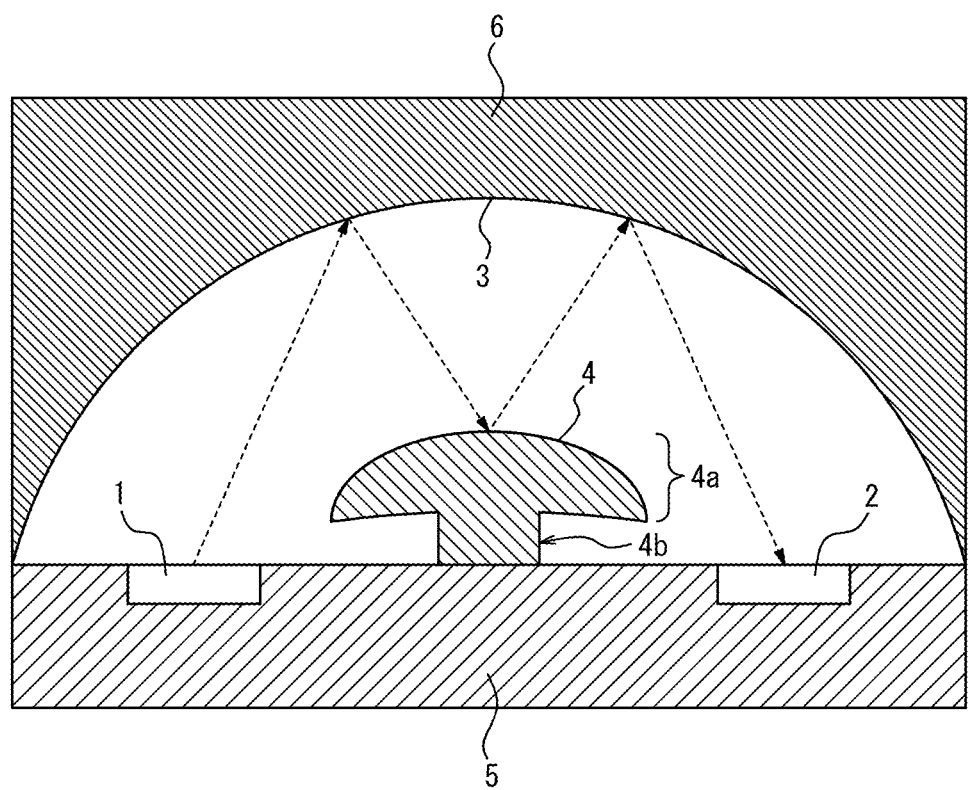
FIG. 1 is a diagram illustrating an example configuration of a gas detection apparatus according to an embodiment of the present disclosure.

FIG. 1 is a diagram illustrating the configuration of a gas detection apparatus according to a first embodiment. The gas detection apparatus is an apparatus that measures the concentration of a gas to be detected in the gas. In the present embodiment, the gas detection apparatus is an apparatus employing the non-dispersive infrared (NDIR) spectroscopy for measuring the concentration of the gas to be detected based on infrared light which has transmitted through the introduced gas. Examples of the gas to be detected may include carbon dioxide, water vapor, carbon monoxide, nitric oxide, ammonium, sulfur dioxide, alcohol, formaldehyde, methane, propane, and CFC substitutes. In one example, the gas detection apparatus is a small-sized apparatus with length×width×height of 30 mm×20 mm×10 mm and is also referred to as a "gas sensor". Here, the drawings are schematic. For example, the relation between length, width, and height in the drawings differs from the real relation.

The gas detection apparatus includes a light emitting portion 1, a light receiving portion 2, and a first mirror 3 and a second mirror 4 as light guide portions that guide the light from the light emitting portion 1 to the light receiving portion 2. The gas detection apparatus may further include a sealing member 5 that seals at least the light emitting portion 1 and the light receiving portion 2. The gas detection apparatus may also include a control unit that accessorily controls at least one of the light emitting portion 1 and the light receiving portion 2. Here, the light emitting surface of the light emitting portion 1 and the light receiving surface of the light receiving portion 2 are in contact with the space (sensing space) inside the gas detection apparatus. The gas detection apparatus also includes a gas port that introduces and discharges the gas to/from the sensing space.

The reflective surface of the first mirror 3 is a quadric surface, and the reflective surface of the second mirror 4 is also a quadric surface. Here, the quadric surface may be a spherical surface or a spheroid. The quadric surface of the first mirror 3 and the quadric surface of the second mirror 4 have convex portions facing in a same direction. In the example of FIG. 1, the convex portion of the quadric surface of the first mirror 3 faces up, and the convex portion of the quadric surface of the second mirror 4 also faces up. Here, the phrase "facing in a same direction" is not limited to a case where the directions are exactly the same and also includes a case where there is a slight deviation in directions of the convex portions of the quadric surfaces, as long as light is reflected between the first mirror 3 and the second mirror 4. Here, the term "up" refers to the direction of a light guide member 6 when viewed from the sealing member 5. In addition, when the light emitting portion 1 or the light receiving portion 2 has a horizontal light emitting surface or light receiving surface, the term "up" is also determined as a direction perpendicular to the light emitting surface or the light receiving surface and in which the mirror exists. In the present embodiment, the gas detection apparatus includes the light guide member 6. As illustrated in FIG. 1, the first mirror 3 is provided on the inner surface of the light guide member 6, and the light guide member 6 is fixed by the sealing member 5 so as to cover the light emitting portion 1 and the light receiving portion 2. In the present embodiment, the second mirror 4 is provided on the surface of a member including a reflecting portion 4a and a supporting portion 4b that supports the reflecting portion 4a. The supporting portion 4b is coupled to the reflecting portion 4a at the top and fixed by the sealing member 5 at the bottom. Here, in the example of FIG. 1, the length (width) of the supporting portion 4b is shorter than that of the reflecting portion 4a in the lateral direction (direction normal to the height direction), but the shape is not limited to such a shape. In another example, the width of the supporting portion 4b may be the same as that of the reflecting portion 4a (see FIG. 4). The second mirror 4 may be provided, for example, on a member without the supporting portion 4b. That is, the second mirror 4 may be provided on the surface of the reflecting portion 4a directly disposed on the sealing member 5.

The following describes the details of the components of the gas detection apparatus according to the present embodiment.

<Light Emitting Portion>

The light emitting portion 1 is a component for emitting light used for detection of the gas to be detected. The light emitting portion 1 is not particularly limited as long as it outputs light including light components in wavelengths absorbable by the gas to be detected. In the present embodiment, the light emitted by the light emitting portion 1 is, but not limited to, infrared light.

Figure 11:
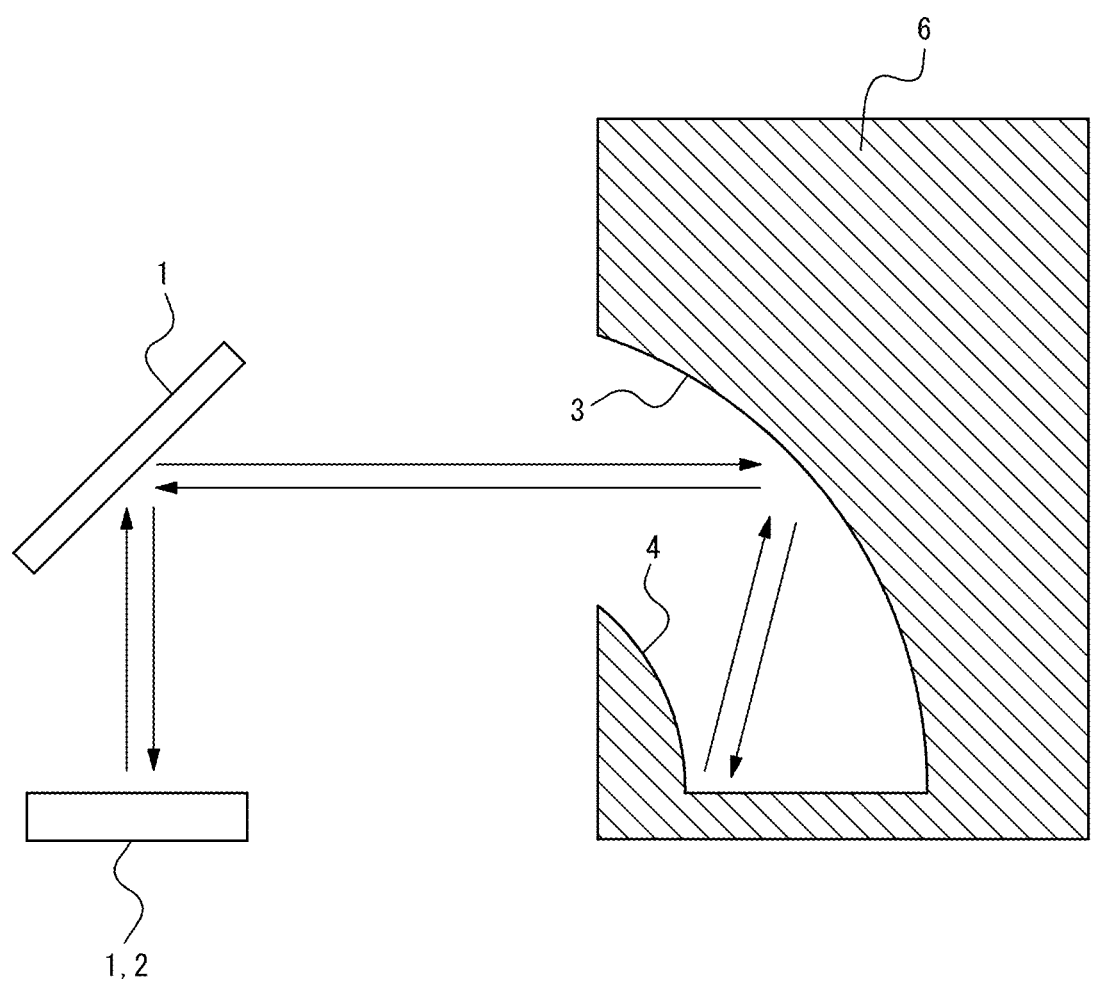
FIG. 11 is a diagram illustrating an example configuration including a passive element.

The light emitting portion 1 is configured including a light emitting element. In the present embodiment, the light emitting element is a light emitting diode (LED). In another example, the light emitting element may be a lamp, a light amplification by stimulated emission of radiation (LASER), an organic light emitting element, or a micro electro mechanical systems (MEMS) heater. The light emitting portion 1 may be configured including not only the light emitting element but also a passive element that passively emits light by receiving the light emitted by the light emitting element (see FIG. 11). The passive element is, for example, a reflecting mirror, an optical filter, a fluorescent substance, an optical image, an optical fiber, an optical waveguide, a lens, or a diffraction grating. In view of downsizing, the light emitting portion 1 preferably includes a semiconductor light emitting element (as one example, LED). The light emitting element is preferably a planar light source. As used herein, the term "light emitting surface" refers to a surface which is in contact with the gas to be detected at the light emitting portion 1 of the element and is made from an optically transparent material.

<Light Receiving Portion>

The light receiving portion 2 is a component for receiving light which has transmitted through a gas introduced into the sensing space. The light receiving portion 2 is not particularly limited as long as it has sensitivity to light in bandwidths including wavelengths absorbable by the gas to be detected. In the present embodiment, the light received by the light receiving portion 2 is, but not limited to, infrared light.

The light receiving portion 2 is configured including a light receiving element. In the present embodiment, the light receiving element is a photodiode. In another example, the light receiving element may be a phototransistor, a thermopile, a pyroelectric sensor, a bolometer, or a photoacoustic detector. The light receiving portion 2 may be configured including not only the light receiving element but also an indirect element that guides light to the light receiving element. The indirect element is, for example, a reflecting mirror, an optical filter, a fluorescent substance, a lens, a diffraction grating, an optical fiber, or an optical waveguide.

In view of downsizing, the light receiving portion 2 preferably includes a semiconductor light receiving element (as one example, photodiode). As used herein, the term "light receiving surface" refers to a surface which is in contact with the gas to be detected at the light sensitive portion 2 of the element and is made from an optically transparent material.

<Light Guide Portion>

The light guide portion is a member for guiding the light emitted from the light emitting portion 1 to the light receiving portion 2 and is an optical system of the gas detection apparatus. As described above, the light guide portion includes the first mirror 3 and the second mirror 4 having the reflective surfaces that are quadric surfaces. In the present embodiment, the first mirror 3 is provided on the inner surface of the light guide member 6, and the reflective surface of the first mirror 3 and the reflective surface of the second mirror 4 are at least partially opposed to one another. The first mirror 3 reflects the light emitted from the light emitting portion 1. The second mirror 4 reflects the light reflected by the first mirror 3 to the first mirror 3. The first mirror 3 also reflects the light reflected by the second mirror 4 to the light receiving portion 2. Here, in the example of FIG. 1, the second mirror 4 reflects the light reflected by the first mirror 3 to the first mirror 3 only once, but reflection may be performed a plurality of times. The light from the light emitting portion 1 is reflected by the first mirror 3, reflected by the second mirror 4 at least once, and then reflected by the first mirror 3 to reach the light receiving portion 2. The case where the first mirror 3 "reflects the light emitted from the light emitting portion 1" includes not only a case where the light emitted from the light emitting portion 1 directly reaches the first mirror 3, but also a case where the light emitted from the light emitting portion 1 reaches the first mirror 3, for example, via another reflecting mirror. Similarly, the case where the first mirror 3 "reflects" the light reflected by the second mirror 4 "to the light receiving portion 2" includes not only a case where the light reflected by the second mirror 4 directly reaches the light receiving portion 2, but also a case where the light reflected by the second mirror 4 reaches the light receiving portion 2, for example, via another reflecting mirror.

The light guide portion may supplementarily further include a reflecting mirror, a lens, a diffraction grating, or an optical filter, in addition to the first mirror 3 and the second mirror 4. For example, the first mirror 3 or the second mirror 4 may include a wavelength selection type reflection filter. When the first mirror 3 or the second mirror 4 includes a wavelength selection type reflection filter, it is no longer necessary to provide an optical filter for wavelength selection in the light emitting portion 1 or the light receiving portion 2. This can equalize the optical distance from the light emitting portion 1 to the first mirror 3 and the optical distance from the first mirror 3 to the light receiving portion 2 to reduce the aberration. Moreover, the second mirror 4 may include a diffraction grating to further reduce the aberration while selecting the wavelength.

Examples of the material composing the first mirror 3 and the second mirror 4 may include, but are not limited to, metals, glass, ceramics, and stainless steels, for example. From the viewpoint of improving the detection sensitivity, the reflective surfaces of these mirrors are preferably made of a material having a low light absorption coefficient and a high reflectance. Specifically, resin housings provided with coating of an alloy containing aluminum, gold, or silver, a dielectric, or a laminate of these materials are preferred. Examples of the material of the resin housings include liquid crystal polymer (LCP), polypropylene (PP), polyetheretherketone (PEEK), polyamide (PA), polyphenylene ether (PPE), polycarbonate (PC) or polyphenylene sulfide (PPS), polymethyl methacrylate resin (PMMA), polyarylate resin (PAR), and hard resins obtained by mixing two or more of these materials. Resin housings coated with gold or an alloy layer containing gold are preferred in view of the reliability and degradation over time. Further, a laminated film of a dielectric is preferably formed on the surface of the metal layer for increasing the reflectance. When the light guide member 6 is the resin housing and the first mirror 3 is formed on the inner surface of the light guide member 6 by vapor deposition or plating of metal, a higher productivity can be achieved and improved lightweightness can be provide as compared with cases where the light guide member 6 and the first mirror 3 are entirely made from a metal material. Further, when the sealing member 5 is made from a resin, the thermal expansion coefficient difference with the sealing member 5 is reduced, which can suppress thermal deformations to thereby reduce sensitivity fluctuations. Similarly, when the supporting portion 4b and the reflecting portion 4a are the resin housings and the second mirror 4 is formed on the surface of the reflecting portion 4a by vapor deposition or plating of metal, a higher productivity can be achieved and improved lightweightness can be provided, which can suppress thermal deformations to thereby reduce sensitivity fluctuations. When the light guide member 6 is produced by press working a metal plate, the productivity and reliability can be improved. Examples of the metal plate include an alloy containing aluminum, gold, or silver, or these materials provided with coating of a dielectric monolayer film or a dielectric lamination.

<Sealing Member>

The sealing member 5 is a member for sealing and holding the light emitting portion 1 and the light receiving portion 2. The sealing member 5 also holds the light guide portion. In the present embodiment, the light guide member 6 and the supporting portion 4b are held by the sealing member 5. Here, the term "hold" means to maintain the relative positional relation of the respective members against the external force. The form of holding is not particularly limited. When the gas detection apparatus includes the control unit, the sealing member 5 may further seal and hold the control unit.

The sealing member 5 is not limited to a specific member as long as it can hold the light emitting portion 1, the light receiving portion 2, and the light guide portion. In the present embodiment, the sealing member 5 is a resin package. In the present embodiment, the resin package internally includes a lead frame, and the light emitting portion 1 and the light receiving portion 2 are electrically connected to the lead frame via a wire or the like. When the gas detection apparatus includes the control unit, the light emitting portion 1, the light receiving portion 2, and the control unit may be electrically connected via the lead frame. In another example, the sealing member 5 may be a semiconductor substrate, a printed board, or a ceramic package. For example, when the sealing member 5 is a semiconductor substrate, the light emitting portion 1 and the light receiving portion 2 may be formed on the semiconductor substrate. For example, when the sealing member 5 is a printed board, the light emitting portion 1 and the light receiving portion 2 may be electrically and mechanically joined by soldering. The light guide portion is mechanically held to the sealing member 5 by adhesive, screws, nails, mating, grommets, welding, or the like. The sealing member 5 may have a connecting terminal for performing electrical connection between the gas detection apparatus and the external device.

<Control Unit>

The control unit is a member for controlling at least one of the light emitting portion 1 and the light receiving portion 2. The control unit may have an analog-digital converter circuit that converts an analog electrical signal output from the light receiving portion 2 to a digital electrical signal. Further, the control unit may have a computation unit that computes the concentration of the gas to be detected based on the converted digital electrical signal. The control unit may be included in the gas detection apparatus or provided as an external device electrically connected to the gas detection apparatus.

The control unit may include at least one of a general-purpose processor that performs functions according to a program that is read, and a dedicated processor specialized for particular processing. The dedicated processor may include an application specific integrated circuit (ASIC). The processor may include a programmable logic device (PLD). The control unit may be under the second mirror 4. When the control unit is under the second mirror 4, the second mirror 4 functions as an electromagnetic shield, which reduces the noise of an electrical signal output from the control unit. Here, phrase "under the second mirror 4" refers to being lower than the second mirror 4 in the height direction and within the reflecting portion 4a of the second mirror 4 in the lateral direction.

(Detail of Configuration)

Figure 2:
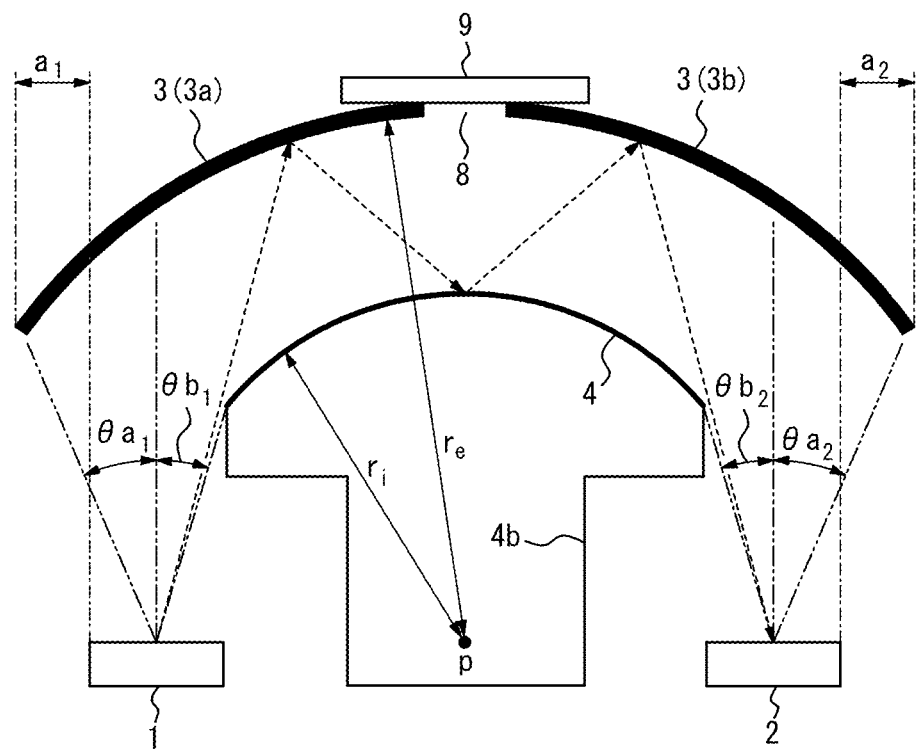
FIG. 2 is a diagram for explaining an example of the disposition and shapes of components of the gas detection apparatus in FIG. 1.

FIG. 2 is a diagram for explaining the disposition and shapes of the components of the gas detection apparatus in FIG. 1. However, the illustration of the components other than the light emitting portion 1, the light receiving portion 2, the first mirror 3, and the second mirror 4 is omitted.

Figure 8:
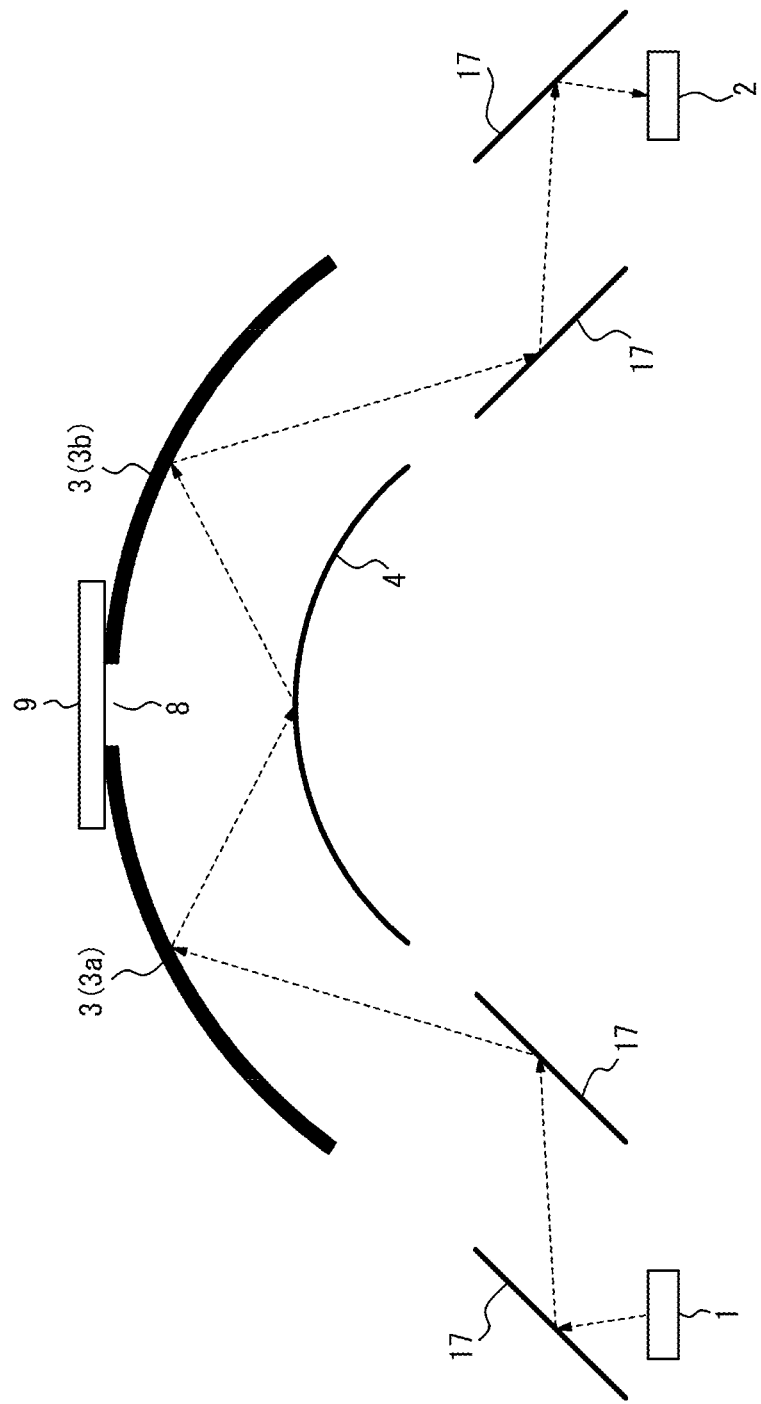
FIG. 8 is a diagram illustrating another example shape of the gas detection apparatus.

The gas detection apparatus according to the present embodiment includes the first mirror 3 and the second mirror 4 having the reflective surfaces that are both quadric surfaces, as described above. First, the positions in the height direction, on which the first mirror 3 and the second mirror 4 are provided, are described. The first mirror 3 and the second mirror 4 are provided at positions higher than a reference plane, and each height differs. Here, one surface of the substrate on which the light receiving portion 2 and the light emitting portion 1 are mounted is taken as a reference plane, and the height of each mirror is determined by the distance between the reference plane and the point on the reflecting surface that is most distant from the reference plane in each mirror in the vertical direction. The gas detection apparatus according to the present embodiment has a configuration in which the first mirror 3 and the second mirror 4 are also provided on the side of the reference plane (the same side as the light receiving portion 2 and the light emitting portion 1). However, when subsidiary passive elements exist (see, for example, FIG. 8), the reference plane may be an imaginary plane parallel to one plane of the substrate above, including the ray passage portion of the subsidiary passive element, or, the reference plane may be a plane optically conjugate with the light receiving portion or the light emitting section, including the light passing section of the subsidiary passive element.

The first mirror 3 and the second mirror 4 are away from the light emitting portion 1 and the light receiving portion 2 in the height direction and are in, what is called, a floating state. Therefore, the first mirror 3 and the second mirror 4 are less susceptible to heat from the light emitting portion 1 and the light receiving portion 2 and less prone to property fluctuations. Dust contained in the gas introduced into the sensing space may accumulate at the bottom of the sensing space, that is, on the sealing member 5. The first mirror 3 and the second mirror 4 are in, what is called, a floating state, on which dust are less likely to accumulate. The sealing member 5 on which the light emitting portion 1, the light receiving portion 2, the control unit, and the like are disposed includes many planar shape parts. Thus, in many cases, the sealing member 5 is on the lower side with respect to gravity. That is, the angle between the upper direction of the gas detection apparatus and the gravitational acceleration direction is 90° to 180°.

Next, the range to which the first mirror 3 and the second mirror 4 extend in the width direction (lateral direction) is described. For the light emitting portion 1 and the light receiving portion 2, when the direction to the intermediate position between the light emitting portion 1 and the light receiving portion 2 is the inside and the direction opposite to the inside is the outside, the first mirror 3 extends from the outside of the light emitting portion 1 to the outside of the light receiving portion 2. As illustrated in FIG. 2, when the distance in the width direction between the outer end of the light emitting portion 1 and the end closest to the light emitting portion 1 of the first mirror 3 is $a_1$, $a_1$ is zero or more. When the distance in the width direction between the outer end of the light receiving portion 2 and the end closest to the light receiving portion 2 of the first mirror 3 is $a_2$, $a_2$ is zero or more. That is, in the width direction, the first mirror 3 is disposed to entirely cover the light emitting portion 1 and the light receiving portion 2. The length of a1 can adjust the degree of amount of the light used for gas detection out of the light emitted from the light source. A larger amount of the light used for gas detection increases the SNR of the gas detector. Thus, the gas detection apparatus is required to use as much light as possible for gas detection. However, it is difficult to use all of the light emitted from the light emitting portion 1 for gas detection, due to the interference with the structure of the mirror inside the light guide portion, or the supporting portion 4b. The light emitted in the high angle direction with the normal to the light emitting surface as a reference, out of the light emitted from the light source, is more susceptible to aberration, after passing the light guide portion, than the light emitted in the low angle direction. Therefore, it is difficult to use all of the light emitted from the light emitting portion 1 for gas detection. When the angle between the center of the light emitting portion 1 and the end closest to the light emitting portion 1 of the first mirror 3 is $\theta a_1$, $\theta a_1$ is preferably 65 degrees or less. When the influence of aberration is decreased, $\theta a_1$ is preferably 50 degrees or less.

Similarly, when the angle between the center of the light receiving portion 2 and the end closest to the light receiving portion 2 of the first mirror 3 is $\theta a_2$, $\theta a_2$ is preferably 65 degrees or less. As with the above, when the influence of aberration is decreased, $\theta a_2$ is preferably 50 degrees or less.

In contrast, as illustrated in FIG. 2, when the angle between the center of the light emitting portion 1 and the end closest to the light emitting portion 1 of the second mirror 4 is $\theta b_1$, $\theta b_1$ is zero or more. When the angle between the center of the light receiving portion 2 and the end closest to the light receiving portion 2 of the second mirror 4 is $\theta b_2$, $\theta b_2$ is zero or more. The angles of $\theta b_1$ and $\theta b_2$ are preferably 65 degrees or less for the same reason as $\theta a_1$ and $\theta a_2$. The center of the light emitting portion 1 may be the center of gravity of the light emitting surface. Similarly, the center of the light receiving portion 2 may be the center of gravity of the light receiving surface. The second mirror 4 is provided so as not to block the light emitted from the light emitting portion 1 to reach the first mirror 3 and the light reflected by the first mirror 3 to reach the light receiving portion 2. That is, in the width direction, the second mirror 4 is provided so as not to cover the light emitting portion 1 and the light receiving portion 2.

Here, if the light emitted from the light emitting portion 1 can reach the light receiving portion 2, the first mirror 3 may be separated into a plurality of pieces. That is, the first mirror 3 may be one continuous mirror or may be composed of a mirror 3a and a mirror 3b having a clearance in between, as in FIG. 2. Here, when the first mirror 3 is separated into a plurality of pieces, the total number of the separated mirrors is not limited to two and may be three or more.

When the first mirror 3 is composed of the mirror 3a and the mirror 3b having a clearance in between, as in FIG. 2, this clearance may be used as a gas port. The gas port is a port for introducing the gas to be detected into the light guide portion or discharging the gas to be detected from the light guide portion. It is also preferably to attach a dust filter 9 to the gas port to prevent dirt and dust from entering the light guide portion.

Figure 6:
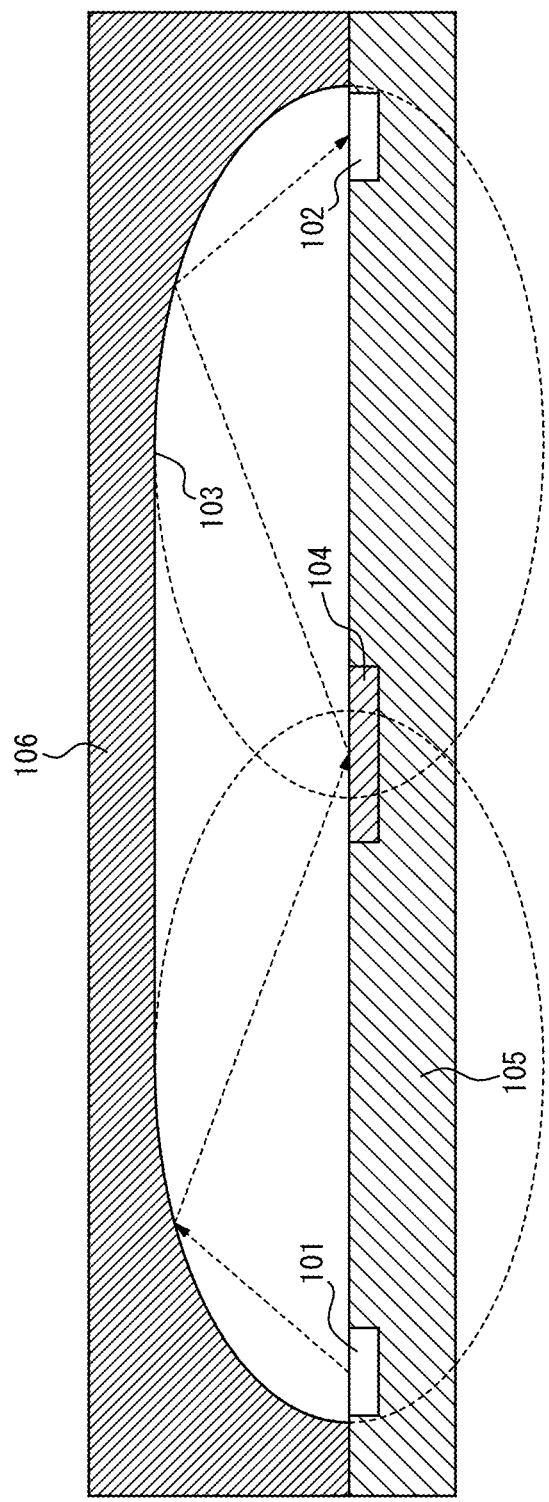
FIG. 6 is a diagram for explaining a problem that an image formed in a gas detection apparatus having an ellipsoid mirror blurs.
Figure 7:
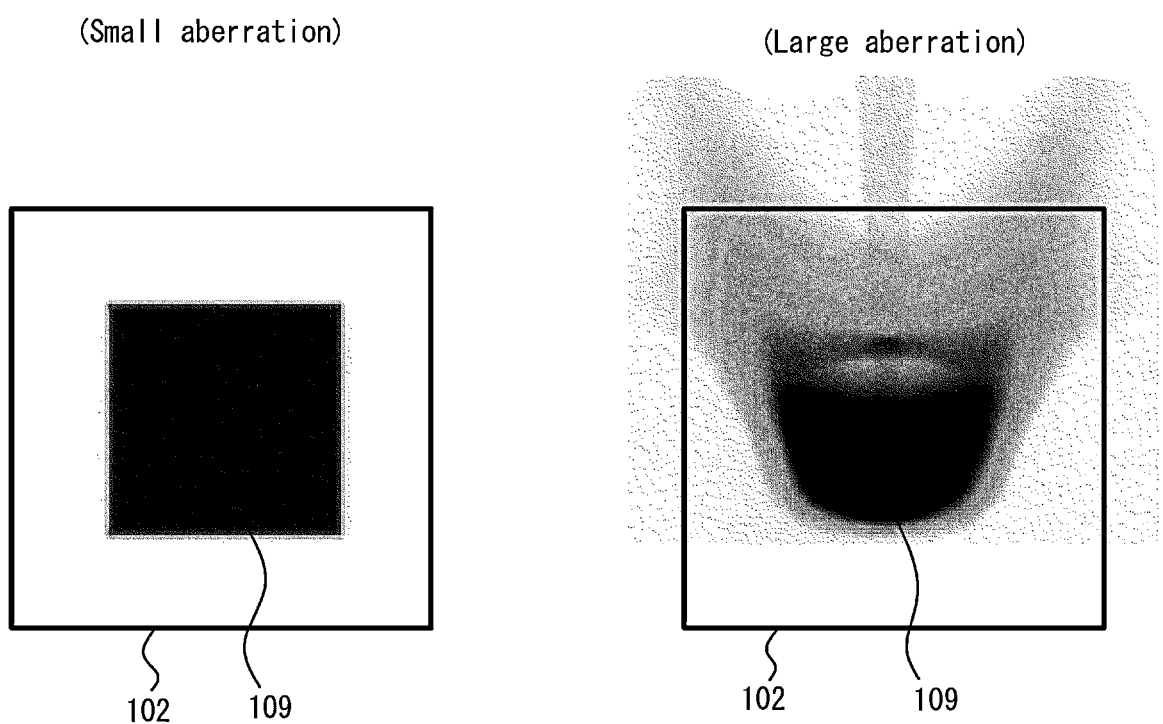
FIG. 7 is a diagram for explaining the problem that an image formed in a gas detection apparatus having an ellipsoid mirror blurs.

As described above, a gas detection apparatus having a conventional configuration, for example, as in FIG. 6 may increase the aberration. In the gas detection apparatus according to the present embodiment, the reflective surfaces of the first mirror 3 and the second mirror 4 are both quadric surfaces, which can suppress an increase in aberration to form an image in the light receiving surface of a light receiving portion 102. In addition, in the gas detection apparatus according to the present embodiment, downsizing is possible by appropriately determining the curvatures of the quadric surfaces, the spacing between the first mirror 3 and the second mirror 4, and the like. For example, when a combination of plane mirrors 17 is each disposed between the light emitting portion 1 and the first mirror 3 and between the light receiving portion 2 and the first mirror 3 as in FIG. 8, low profile can be achieved. For example, in view of the low profile, the spacing between the first mirror 3 and the second mirror 4 is preferably smaller than twice the width of the light emitting portion 1, as one example. With such a configuration, the gas detection apparatus according to the present embodiment allows a small size and measurement with high accuracy.

Figure 12:
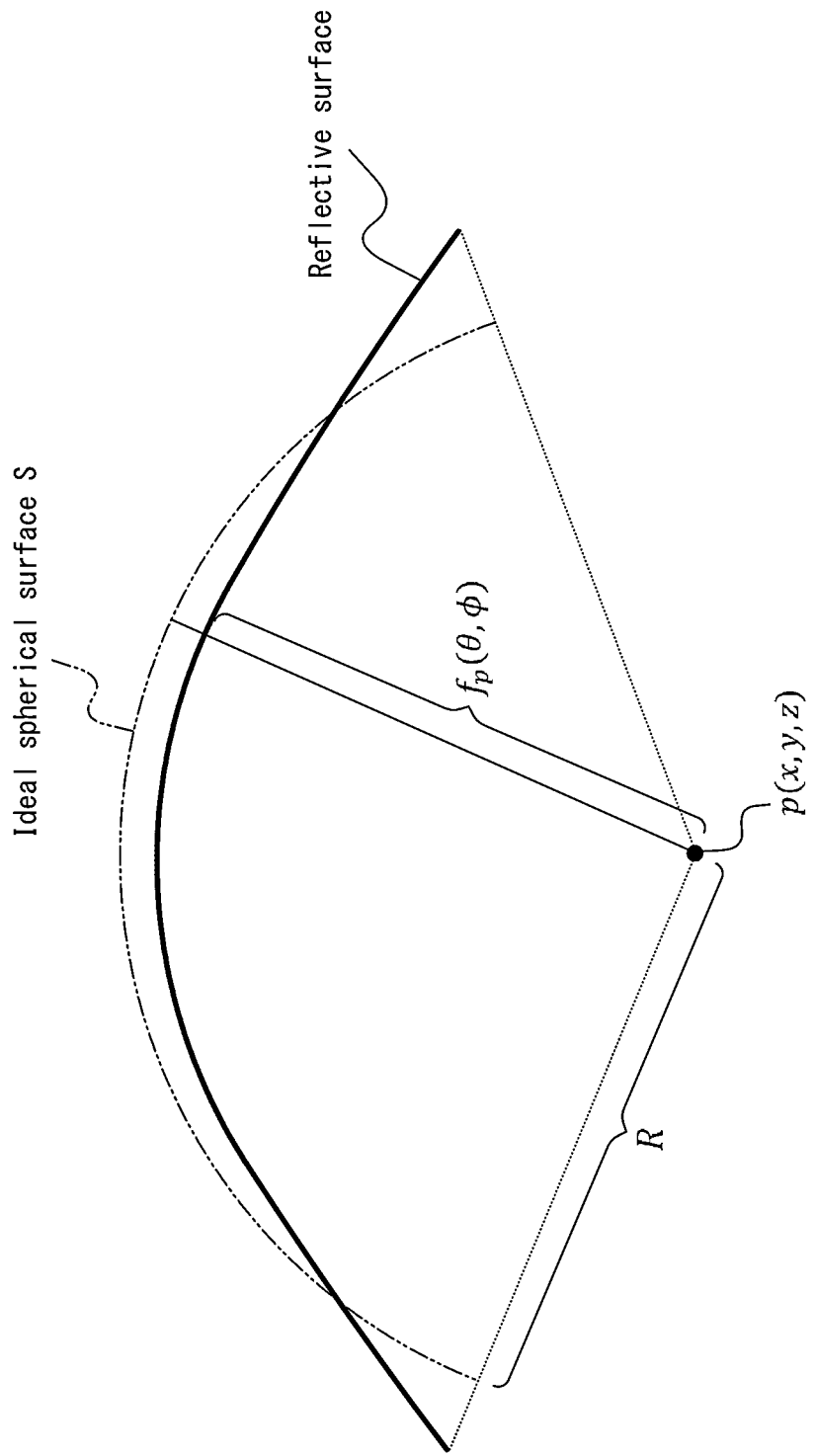
FIG. 12 is a diagram for explaining a case where a reflective surface can be considered as a sphere.

Here, an ellipsoid shape may be used as a specific example of the quadric surface. That is, the reflective surface of the first mirror 3 and the reflective surface of the second mirror 4 may each have a shape of a part of the ellipsoid. A sphere shape may be also used as a specific example of the quadric surface. As illustrated in FIG. 12, given an ideal spherical surface S compared with the reflective surface, when $I_{err}$ determined in Formula (1) below is 0.1 or less, the reflective surface may be considered as a sphere. When the influence of aberration is decreased, $I_{err}$ is preferably 0.01 or less. Where $\Omega$ is the solid angle subtended by the reflecting surface from point P. $\theta$ and $\varphi$ are variables within this $\Omega$. Also, the sag amount difference (distance measured parallel to the optical axis of the deviation from the spherical surface) may be $I_{err}$.

$$I_{err} = \frac{\int_\Omega |f_p^2 - R^2| \sin\theta d\theta d\varphi}{\int_\Omega R^2 \sin\theta d\theta d\varphi} \quad \text{Formula (1)}$$

For example, the reflective surface of the first mirror 3 may have a shape of a part of a first sphere, and the reflective surface of the second mirror 4 may have a shape of a part of a second sphere that is concentric with the first sphere. Further, the radius of the first sphere may be twice the radius of the second sphere. In FIG. 2, when the center of the concentric sphere is p, $r_e$ that is a distance from p to the first mirror 3 corresponds to the radius of the first sphere. Further, $r_i$ that is a distance from p to the second mirror 4 corresponds to the radius of the second sphere. When the radius of the first sphere is twice the radius of the second sphere, the light guide portion is an Offner optical system to further decrease the aberration, which causes the gas detection apparatus to allow measurement with higher accuracy. In the drawing, the first mirror 3 and the second mirror 4 are described as spheres. However, since when the focal point (center point) of a sphere is separated into two points, a spheroid is made, the above description can be generalized to the spheroid.

Figure 3:
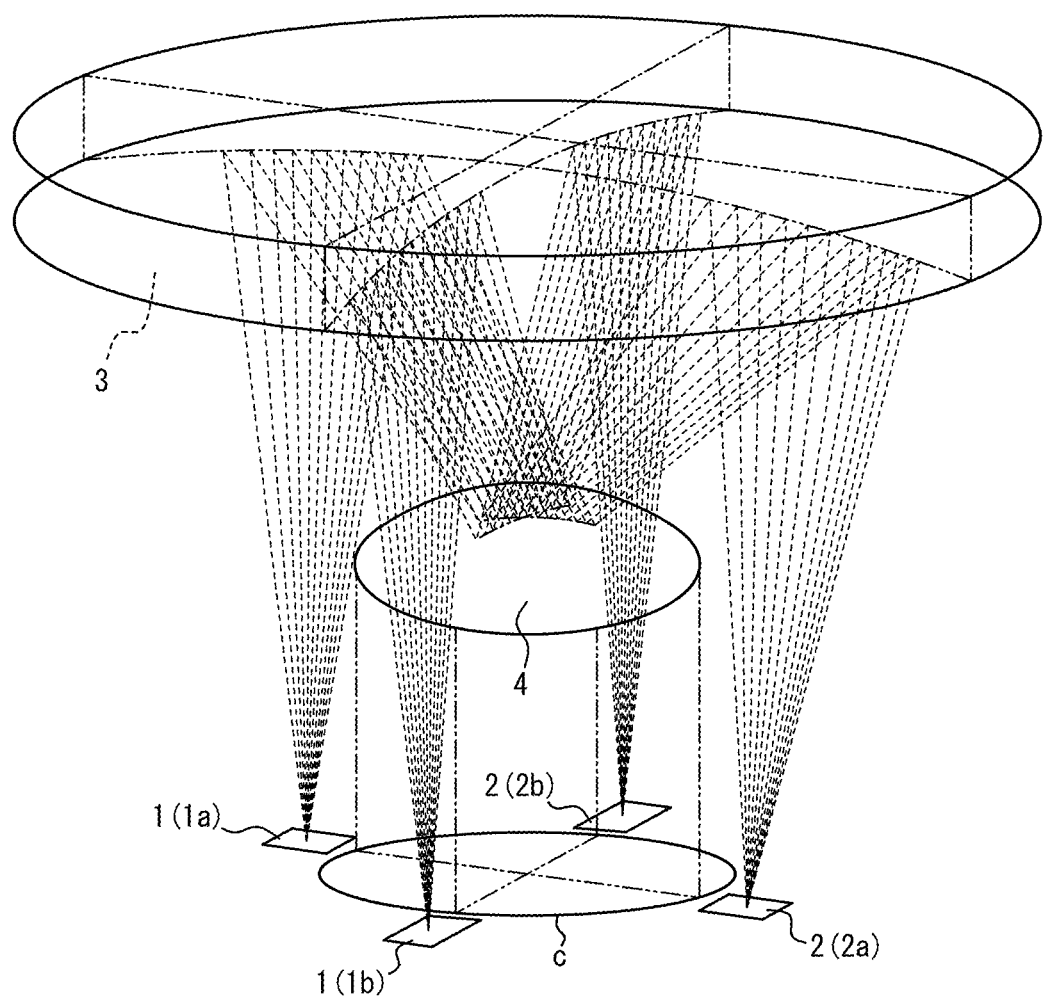
FIG. 3 is a diagram illustrating an example configuration of a gas detection apparatus including a plurality of pairs of a light emitting portion and a light receiving portion.

As illustrated in FIG. 3, the gas detection apparatus may be configured including a plurality of pairs of the light emitting portion 1 and the light receiving portion 2. When the reflective surface of the second mirror 4 is, for example, a sphere, the pairs of the light emitting portion 1 and the light receiving portion 2 are disposed such that the center of a virtual circle c formed by projecting the reflective surface of the second mirror 4 onto the sealing member 5 is the midpoint. The gas detection apparatus in the example of FIG. 3 includes a pair of a light emitting portion 1a and a light receiving portion 2a and a pair of a light emitting portion 1b and a light receiving portion 2b. For example, differentiating the wavelength bands having the sensitivities of the light receiving portion 2a and the light receiving portion 2b can simultaneously detect two different kinds of gas to be detected. Sharing a part of the light guide portion can also detect the change in mirror reflectance with the respective combinations of the light emitting portion 1 and the light receiving portion 2, and the influence of the change in mirror reflectance can be eliminated by signal processing. That is, a small-sized and high-accuracy gas sensor that can detect a plurality kinds of gas can be obtained. Here, the number of the pair of the light emitting portion 1 and the light receiving portion 2 is two (two pairs) in the example of FIG. 3, but it is not limited to two pairs and may be three pairs or more.

As described above, the gas detection apparatus according to the present embodiment allows a small size and can measure the gas to be detected with high accuracy, with the above configuration.

Second Embodiment

Figure 4:
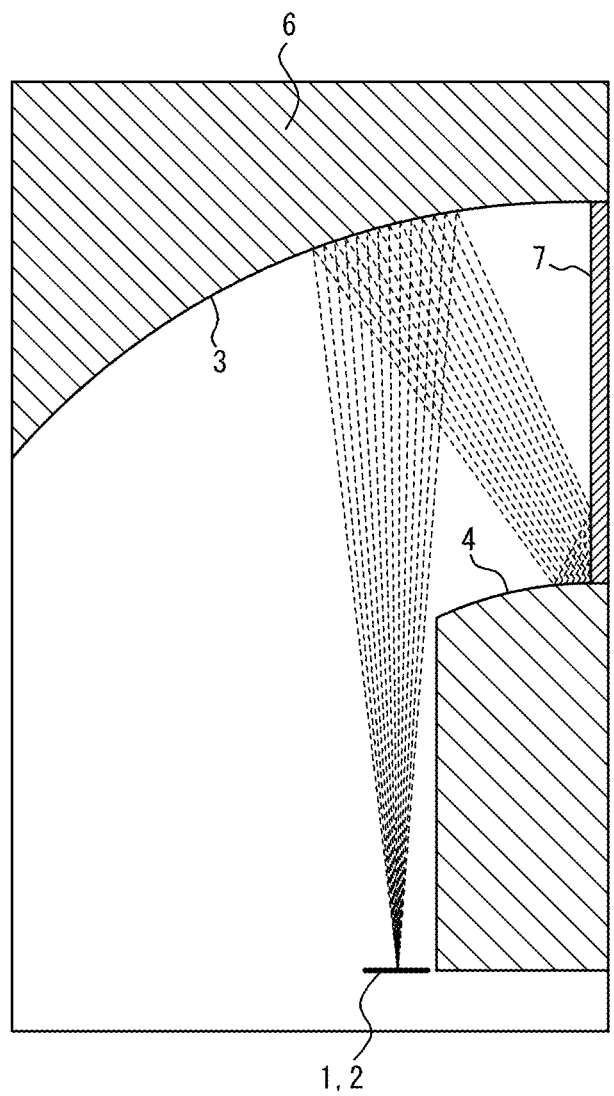
FIG. 4 is a diagram illustrating an example configuration of a gas detection apparatus according to an embodiment of the present disclosure.

FIG. 4 is a diagram illustrating an example configuration of the gas detection apparatus according to a second embodiment. The gas detection apparatus according to the present embodiment further includes a plane mirror 7. The plane mirror 7 is disposed between the reflective surface of the first mirror 3 and the reflective surface of the second mirror 4 to reflect light from one to the other of the first mirror 3 and the second mirror 4. In the example of FIG. 4, the plane mirror 7 disposed such that its reflective surface is along the height direction, but the angle to the height direction may be provided as long as light can be reflected from one to the other of the first mirror 3 and the second mirror 4. To avoid repetition of the description, the configuration different from that of the first embodiment is described below.

The reflective surface of the plane mirror 7 is disposed at a position of the midpoint between the light emitting portion 1 and the light receiving portion 2 in the first embodiment (FIG. 1), in the width direction. Therefore, in the present embodiment, the first mirror 3, together with the reflected image of the first mirror 3 by the plane mirror 7, can be treated as equivalent to the first mirror 3 in FIG. 1. The second mirror 4, together with the reflected image of the second mirror 4 by the plane mirror 7, can be treated as equivalent to the second mirror 4 in FIG. 1. The actual size of the gas detection apparatus according to the present embodiment is half of that of the first embodiment in the width direction. The gas detection apparatus according to the present embodiment can be further downsized by including the plane mirror 7.

Figure 5:
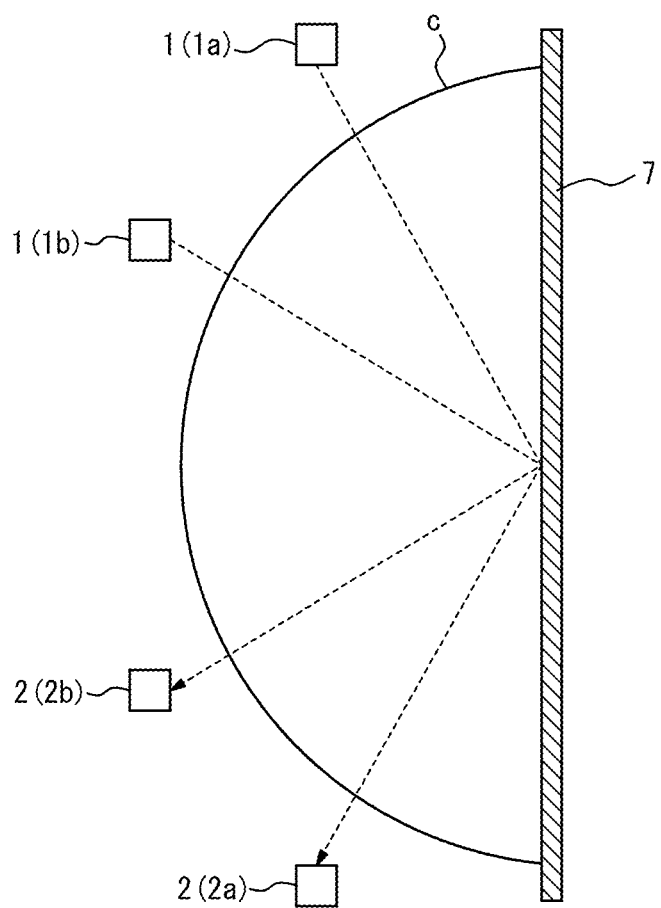
FIG. 5 is a diagram for explaining the disposition of a pair of the light emitting portion and the light receiving portion.

FIG. 5 is a diagram for explaining the disposition of pairs of the light emitting portion 1 and the light receiving portion 2 and illustrates one example viewed from the above toward the sealing member 5 in the height direction. The virtual circle c is similar to that in FIG. 3 but forms a circle together with the reflected image by the plane mirror 7, in the present embodiment. That is, in the present embodiment, the virtual circle c is a semicircle. The light receiving portion 2 is disposed so that the light from the light emitting portion 1, which has been reflected by the plane mirror 7 at the center of the virtual circle c, reaches the light receiving portion 2. The gas detection apparatus in the example of FIG. 5 includes a pair of a light emitting portion 1a and a light receiving portion 2a and a pair of a light emitting portion 1b and a light receiving portion 2b. In the present embodiment as well, a small-sized and high-accuracy gas sensor that can detect a plurality kinds of gas can be obtained. Here, the number of the pair of the light emitting portion 1 and the light receiving portion 2 is two (two pairs) in the example of FIG. 5, but it is not limited to two pairs, may be one pair or may be three pairs or more.

The gas detection apparatus according to the present embodiment allows a small size and measurement with high accuracy as in the first embodiment, and it can be more downsized than that of the first embodiment by including the plane mirror 7. Therefore, the gas detection apparatus according to the present embodiment is particularly effective in applications for which downsizing is required.

Third Embodiment

Figure 9:
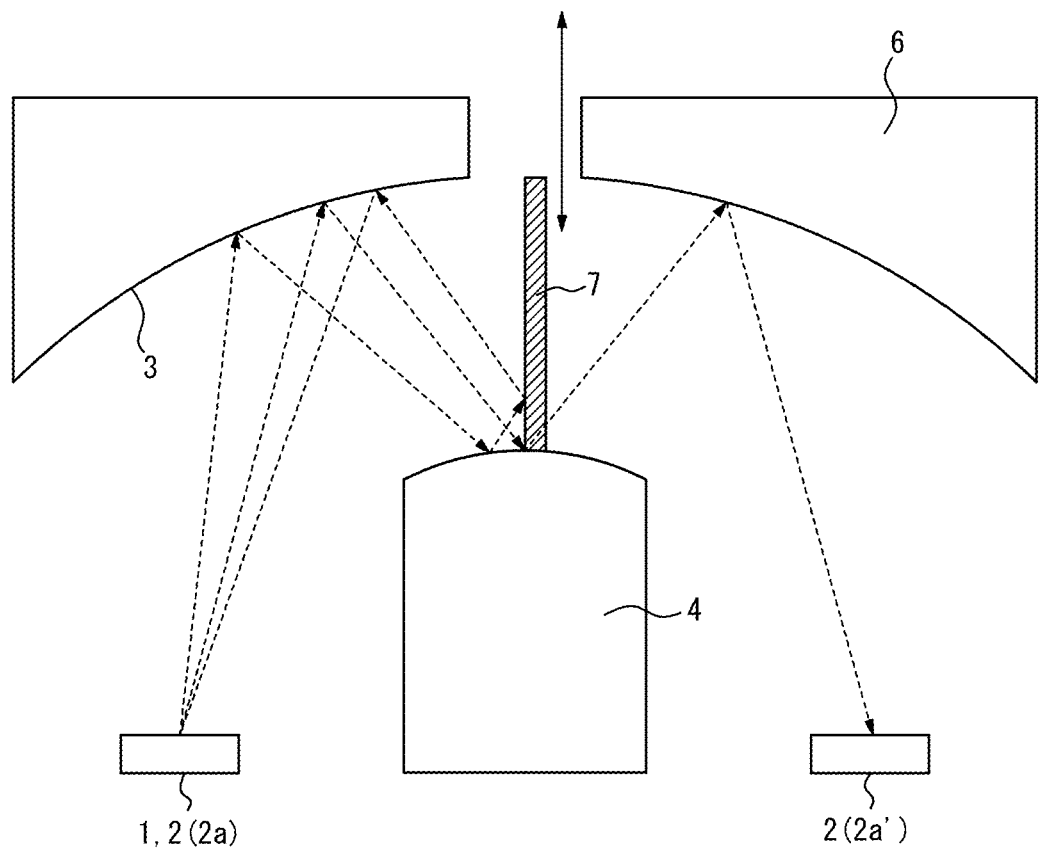
FIG. 9 is a diagram illustrating an example configuration of a gas detection apparatus according to an embodiment of the present disclosure.

FIG. 9 is a diagram illustrating an example configuration of the gas detection apparatus according to a third embodiment. The gas detection apparatus according to the present embodiment includes a plane mirror 7 that can be controlled by an actuator. Controlling the plane mirror 7 by the actuator can switch the light guide portion into which the plane mirror 7 is inserted and the light guide portion into which the plane mirror 7 is not inserted. In FIG. 9, the plane mirror 7 moves in the height direction. However, the moving direction is not limited to this. When the plane mirror 7 is inserted, the plane mirror 7 is disposed between the reflective surface of the first mirror 3 and the reflective surface of the second mirror 4 to reflect light from one to the other of the first mirror 3 and the second mirror 4, as in the second embodiment. When the plane mirror 7 is inserted, the reflective surface of the plane mirror 7 is disposed at a position of the midpoint between the light emitting portion 1 and the light receiving portion 2, in the width direction. Therefore, as in the second embodiment, the first mirror 3, together with the reflected image of the first mirror 3 by the plane mirror 7, can be treated as equivalent to the first mirror 3 in the case where the plane mirror 7 is not inserted. The second mirror 4, together with the reflected image of the second mirror 4 by the plane mirror 7, can be treated as equivalent to the second mirror 4 in the case where the plane mirror 7 is not inserted. In the example of FIG. 9, the plane mirror 7 is disposed such that its reflective surface is along the height direction, but the angle to the height direction may be provided as long as light can be reflected from one to the other of the first mirror 3 and the second mirror 4.

Figure 10:
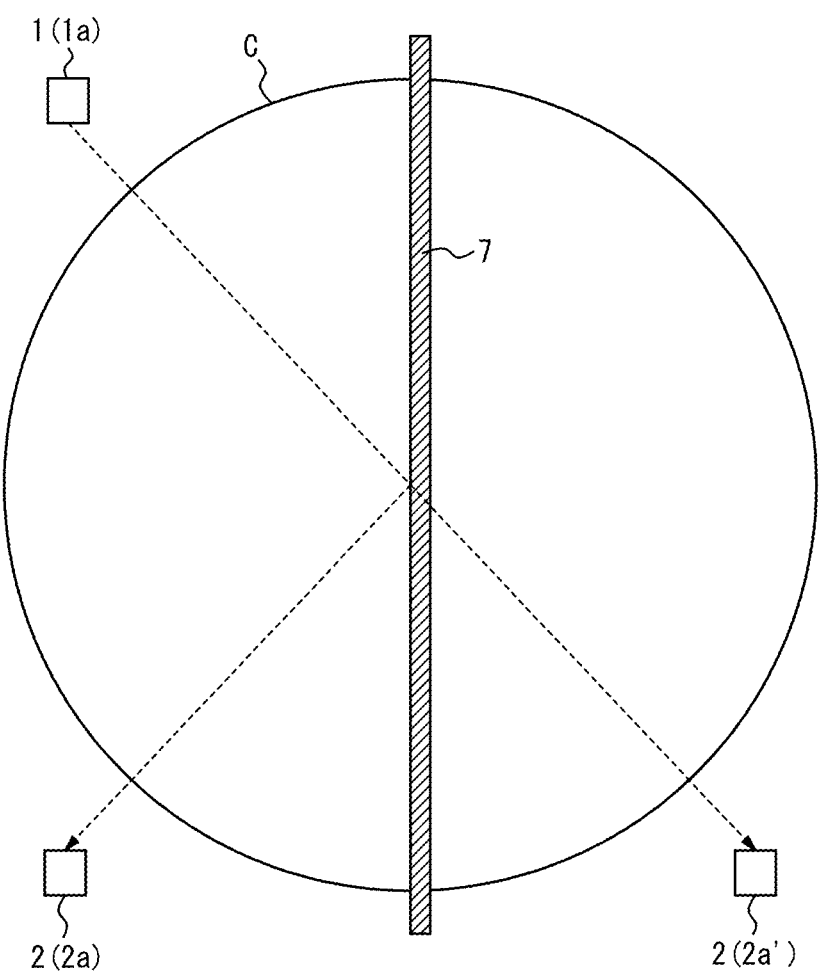
FIG. 10 is a diagram for explaining the disposition of a pair of the light emitting portion and the light receiving portion.

FIG. 10 is a diagram for explaining the disposition of pairs of the light emitting portion 1 and the light receiving portion 2 and illustrates one example viewed from the above toward the sealing member 5 in the height direction. The virtual circle c is similar to that in FIG. 3. In the present embodiment, when the plane mirror 7 is inserted into the light guide portion, the virtual circle is structurally a semicircle but forms a circle together with the reflected image. When the plane mirror 7 is not inserted into the light guide portion and thus does not exist in the light guide portion, the light emitted from the light emitting portion 1a in FIG. 10 is guided to the light receiving portion 2 (2a'). When the plane mirror 7 is inserted into the light guide portion and thus exists in the light guide portion, the light emitted from the light emitting portion 1a is guided to the light receiving portion 2 (2a). Further, when the light receiving portion 2a and the light receiving portion 2a' include different wavelength selection type optical filters, a small-sized gas detection apparatus that can detect a plurality of gases to be detected in a plurality of wavelength bands can be obtained. Here, the number of the pair of the light receiving portions 2 is one (one pair) in the example, but it is not limited to one pair, may be two pairs, or may be two pairs or more.

The gas detection apparatus according to the present embodiment allows a small size and measurement with high accuracy as in the first embodiment and the second embodiment, and it can switch the light guide portion into which the plane mirror 7 is inserted and the light guide portion into which the plane mirror 7 is not inserted by controlling the plane mirror 7 with the actuator. Therefore, for example, a small-sized gas detection apparatus that detects a plurality of gases to be detected in a plurality of wavelength bands can be obtained.

Although the embodiments of the present disclosure have been described with reference to the drawings and the examples, it should be noted that various modifications and variations can be readily conceived of by a person skilled in the art based on the present disclosure. It should be understood that such modifications and variations are encompassed within the scope of the present disclosure. For example, the functions included in each configuration part, or the like can be rearranged unless they are logically contradicted, and a plurality of configuration parts, and the like can be combined into one or a configuration part can be divided, for example.

The invention claimed is:

1. A gas detection apparatus comprising:
   a light emitting portion;
   a light receiving portion;
   a first mirror that has a reflective surface being a quadric surface and reflects light emitted from the light emitting portion; and
   a second mirror that has a reflective surface being a quadric surface and reflects the light reflected by the first mirror to the first mirror, wherein
   the quadric surface of the first mirror and the quadric surface of the second mirror have convex portions facing in a same direction,
   the first mirror reflects the light reflected by the second mirror to the light receiving portion, and
   when one surface of a substrate on which the light emitting portion and the light receiving portion are mounted is used as a reference plane, the first mirror and the second mirror are provided at positions higher than the reference plane and have different heights.

2. The gas detection apparatus according to claim 1, wherein the reflective surface of the first mirror and the reflective surface of the second mirror each have a shape of a part of an ellipsoid.

3. The gas detection apparatus according to claim 2, wherein the reflective surface of the first mirror has a shape of a part of a first sphere, and the reflective surface of the second mirror has a shape of a part of a second sphere that is concentric with the first sphere.

4. The gas detection apparatus according to claim 3, wherein the first sphere has a radius twice a radius of the second sphere.

5. The gas detection apparatus according to claim 1, wherein, for the light emitting portion and the light receiving portion, when a direction to an intermediate position between the light emitting portion and the light receiving portion is an inside and a direction opposite to the inside is an outside, the first mirror extends from the outside of the light emitting portion to the outside of the light receiving portion, and the second mirror extends from the inside of the light emitting portion to the inside of the light receiving portion.

6. The gas detection apparatus according to claim 1, configured including a plurality of pairs of the light emitting portion and the light receiving portion.

7. The gas detection apparatus according to claim 1, further comprising a plane mirror that is disposed between the reflective surface of the first mirror and the reflective surface of the second mirror and reflects light from one to the other of the first mirror and the second mirror.

8. The gas detection apparatus according to claim 1, further comprising a control unit that controls at least one of the light emitting portion or the light receiving portion, under the second mirror.

9. The gas detection apparatus according to claim 1, wherein the first mirror or the second mirror includes a wavelength selection type reflection filter.

10. The gas detection apparatus according to claim 1, wherein the first mirror has a clearance used as a gas port.

11. The gas detection apparatus according to claim 1, wherein, when an angle between the center of the light emitting portion and the end closest to the light emitting portion of the first mirror is $\theta_{a1}$, the $\theta_{a1}$ is 65 degrees or less.

12. The gas detection apparatus according to claim 11, wherein the $\theta_{a1}$ is 50 degrees or less.

* * * * *